(12) United States Patent
Rein

(10) Patent No.: US 7,740,295 B2
(45) Date of Patent: Jun. 22, 2010

(54) SYSTEM AND METHOD FOR CONNECTING ATTACHMENTS TO A VEHICLE

(76) Inventor: Gary Rein, 954 Lexington Ave., New York, NY (US) 10021

( * ) Notice: Subject to any disclaimer, the term of this patent is extended or adjusted under 35 U.S.C. 154(b) by 0 days.

(21) Appl. No.: 12/183,172

(22) Filed: Jul. 31, 2008

(65) Prior Publication Data

US 2009/0284029 A1 Nov. 19, 2009

Related U.S. Application Data

(60) Provisional application No. 61/053,234, filed on May 15, 2008.

(51) Int. Cl.
*B60R 19/44* (2006.01)
(52) U.S. Cl. ........................... 293/142; 293/128
(58) Field of Classification Search ............ 296/136.07, 296/136.1, 136.01; 267/139, 140; 293/142
See application file for complete search history.

(56) References Cited

U.S. PATENT DOCUMENTS

| | | | | |
|---|---|---|---|---|
| 2,729,373 | A * | 1/1956 | Stump ........................ | 224/532 |
| 3,378,296 | A | 6/1965 | Crocker | |
| 3,738,695 | A * | 6/1973 | McBee ........................ | 293/128 |
| 4,838,592 | A * | 6/1989 | Sobodos et al. ............ | 293/109 |
| 4,958,881 | A * | 9/1990 | Piros ........................ | 296/136.02 |
| 4,997,229 | A * | 3/1991 | Swanson ............... | 296/136.08 |
| 5,012,602 | A * | 5/1991 | Storey ........................ | 40/201 |
| 5,071,181 | A * | 12/1991 | Wagner ........................ | 293/128 |
| 5,791,533 | A * | 8/1998 | Neag et al. ............... | 224/42.21 |
| 6,398,276 | B1 | 6/2002 | Smith | |
| D471,497 | S | 3/2003 | Baker | |
| 6,572,086 | B2 | 6/2003 | Kelly | |
| 6,572,163 | B1 * | 6/2003 | Pickett ........................ | 293/142 |
| 6,637,790 | B2 | 10/2003 | Bio | |
| 6,837,534 | B2 | 1/2005 | O'Connell | |
| 6,905,153 | B2 | 6/2005 | Murray et al. | |
| D508,222 | S * | 8/2005 | Tekavec .................... | D12/167 |
| 7,073,830 | B1 | 7/2006 | Chen et al. | |
| 7,316,433 | B2 | 1/2008 | Levine | |
| 7,338,100 | B2 * | 3/2008 | Meyer ........................ | 293/142 |
| 2002/0024224 | A1 * | 2/2002 | Bio ........................... | 293/142 |
| 2006/0156595 | A1 * | 7/2006 | Kasak et al. .................. | 40/209 |
| 2007/0290515 | A1 | 12/2007 | Doan | |
| 2009/0284029 | A1 * | 11/2009 | Rein ........................... | 293/142 |
| 2009/0284030 | A1 * | 11/2009 | Rein ........................... | 293/142 |

* cited by examiner

*Primary Examiner*—Kiran B. Patel
(74) *Attorney, Agent, or Firm*—Keith D. Nowak; Carter Ledyard & Milburn LLP

(57) ABSTRACT

The present invention is directed to a system and method for connecting attachments to a vehicle including in a first embodiment a bumper guard that provides a barrier of protection for vehicle bumpers. The bumper guard includes two pieces, a first piece or bumper guard locator and a second piece or bottom piece. The first piece is attached to a vehicle through the lower holes in a license plate and is secured or locked in place using a locking mechanism. The second piece attaches, or depends from the first piece and is dimensioned and configured to rest over a bumper of the vehicle. The second piece is removably connected to the first piece and may be replaced when damaged or worn. Alternatively, in a second embodiment of the invention, the second piece may be a different component such as a "tailgating platform tray", or other component module that attaches to a "T" locking system. The bumper guard or platform tray can be easily attached to the vehicle, stored and removed.

8 Claims, 4 Drawing Sheets

SYSTEM AND METHOD FOR CONNECTING ATTACHMENTS TO A VEHICLE

PRIORITY AND RELATED APPLICATION

This application claims priority to U.S. Provisional Patent Application Ser. No. 61/053,234, filed May 15, 2008, entitled "BUMPER GUARD," which is hereby incorporated by reference in its entirety.

FIELD OF THE INVENTION

The present invention relates to a system and method for connecting attachments to a vehicle, including a bumper guard for motor vehicle bumpers, as well as other modular attachments to the rear of the vehicle.

BACKGROUND OF THE INVENTION

The majority of today's vehicles have integral colored single-piece thermoplastic covers over their bumpers that are particularly vulnerable to indentation. Current design aesthetics, as well as cost efficiencies have eliminated the use of secondary protective chrome, or rubber trims, that would normally serve to reduce the indentations and abrasions from the low impact hits that leave permanent impressions on the rear bumper. Our urban environments do little to protect motor vehicle bumpers. For instance, in garages, there is a tendency to compress as many cars as possible into a limited space by making direct contact between front and rear bumpers of adjacent vehicles. The resulting damage usually occurs from the bolts of the front license plate becoming embedded into the rear bumper of the next car. A bumper guard is needed that easily protects bumpers, including rear bumpers, of most motor vehicles such as recent model vehicles. In addition, by creating the attachment device to secure the Bumper Guard to the vehicle, alternative products can be attached that enhance the life cycle and usability of the product.

BRIEF SUMMARY OF THE INVENTION

One embodiment of the present invention is bumper guard for motor vehicles. The bumper guard has a first piece or bumper guard locator and a second piece or bottom piece. The first piece is attached to sleeves that are screwed into the vehicle through the lower holes in a license plate or is attached using a replacement license plate holder that has integral sleeves. The first piece is secured or locked in place using a locking mechanism. Specifically, the locking mechanism, which includes a cam and rods, works by rotating the cam to elongate said rods under the sleeves and securing the first piece to the vehicle. The second piece may be made of cross-linked polyethylene foam, or other foam barrier product, and is dimensioned and configured to rest over a bumper of the vehicle. The second piece is removably connected to the first piece and may depend from an integral molded "T" that is part of the first piece. The removably connected second piece may be replaced when damaged or worn. The bumper guard provides a barrier of protection to the bumpers of recent model vehicles. The bumper guard can be easily attached to the vehicle, stored and removed.

In a second embodiment of the invention, the first piece, that has a pair of integral "T's" molded into the bottom, also can accept a variety of alternative second pieces, such as a "tailgate platform" which depends perpendicularly from the first piece. Other attachments are also possible for a variety of purposes.

DETAILED DESCRIPTION OF THE INVENTION

Figure 1:
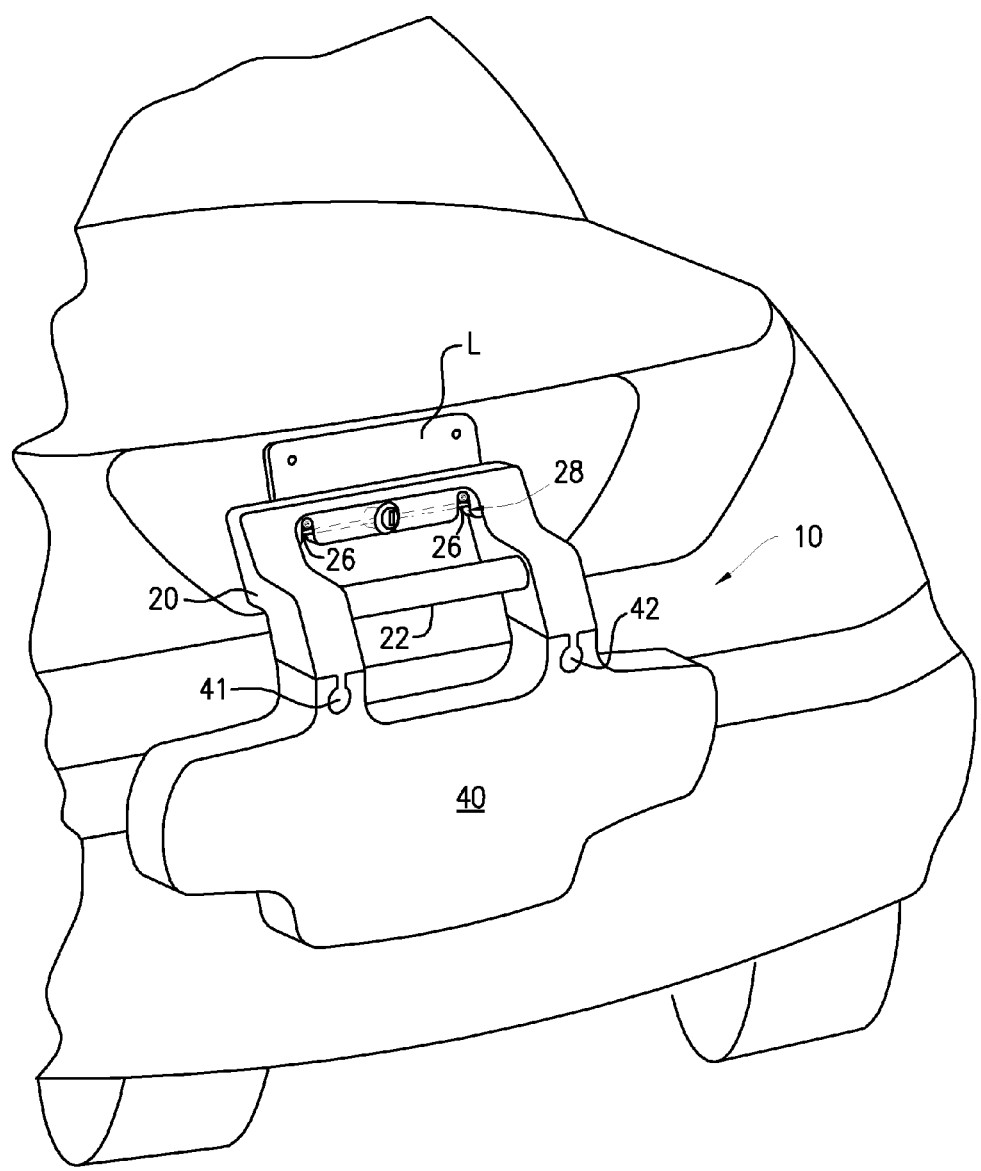
FIG. 1 is an environmental perspective view of a first embodiment of the present invention.

FIG. 1 shows a bumper guard 10 of the present invention attached to a rear end of a vehicle. The bumper guard 10 includes two pieces, a first piece or bumper guard locator 20 and a second piece or bottom piece 40. The first piece or locator 20 has a handle 22, grooves 28 and a locking mechanism including cam 24 and rods 26. The handle 22 may be integrated in the locator 20 and facilitates installation and removal of the guard 10. The second piece or bottom piece 40 depends from the locator 20. A pair of "T's" 41, 42 are molded in to the first piece locator 20, onto which the second piece 40 is connected to create a "modular connection system" for additional elements to depend from.

Figure 2:
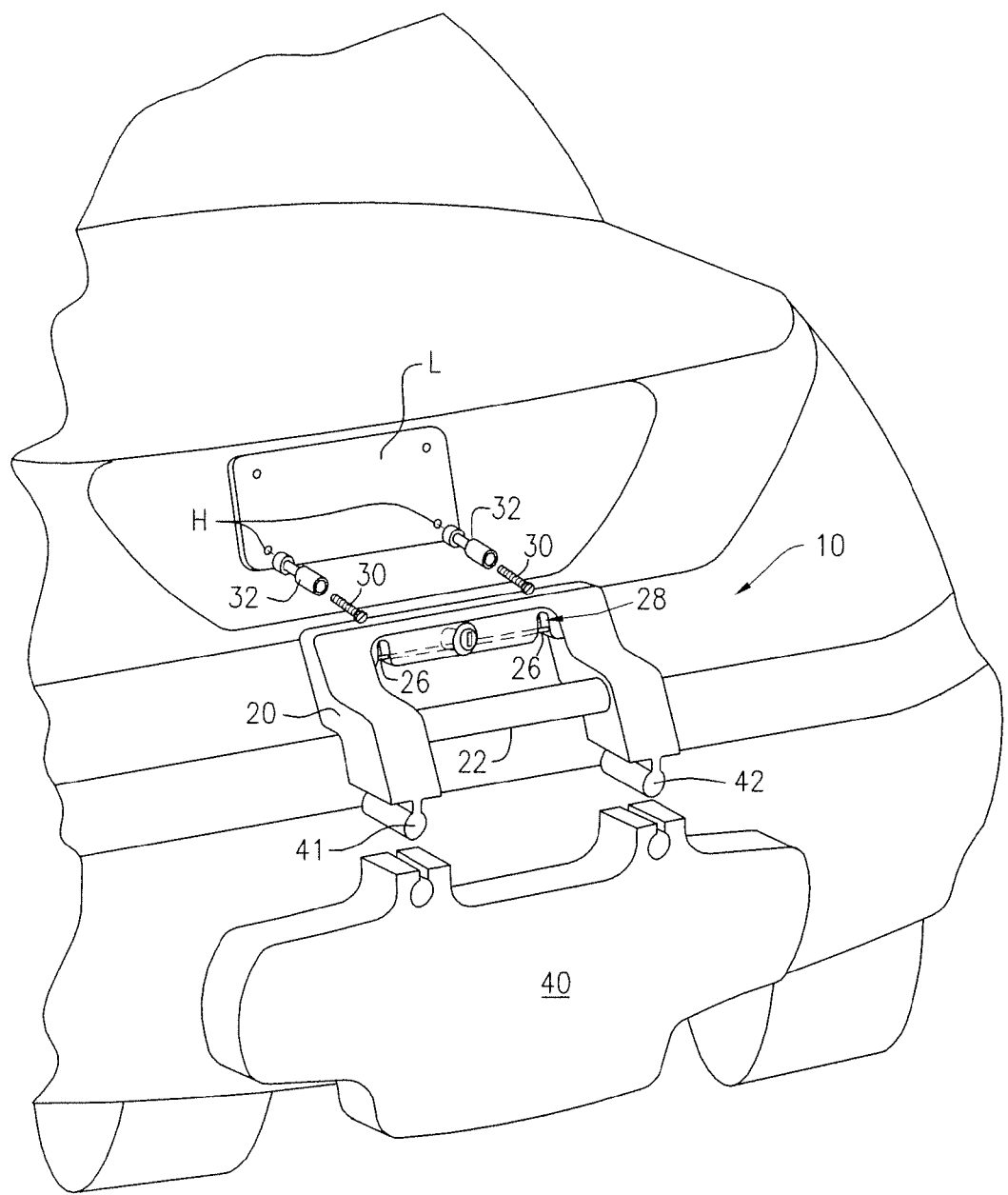
FIG. 2 shows an exploded view of the bumper guard of the present invention.

FIG. 2 shows an exploded view of the guard 10. Sleeves 32 connect to the rear of a vehicle through holes H of license plate L. Specifically, the sleeves 32 are dimensioned and configured to fit over screws 30, the sleeves 32 then fit or screw into holes H via the screws 30. In some embodiments, the sleeves 32 may be designed to screw directly into the holes H and replace the screws 30. The sleeves 32 may be made of plastic, such as polycarbonate, or other suitable material. The sleeves 32 have a tapered lead-in shape that are dimensioned and configured to the grooves 28 of the locator 20. The grooves 28 of the first piece or locator 20 align with the sleeves 32 that are disposed in holes H of the license plate L. In an alternative embodiment, the sleeves are integral into a separate license plate holder, providing the same method of attachment as with the separate sleeves. Thus, the sleeves 32 and the grooves 28 easily align with each other allowing the locator or first piece 20 to slide over or on the sleeves 32. A user may use the handle 22 to help place the locator 20 over the sleeves 32 since the handle 22 is in close proximity to the point of alignment.

Figure 3:
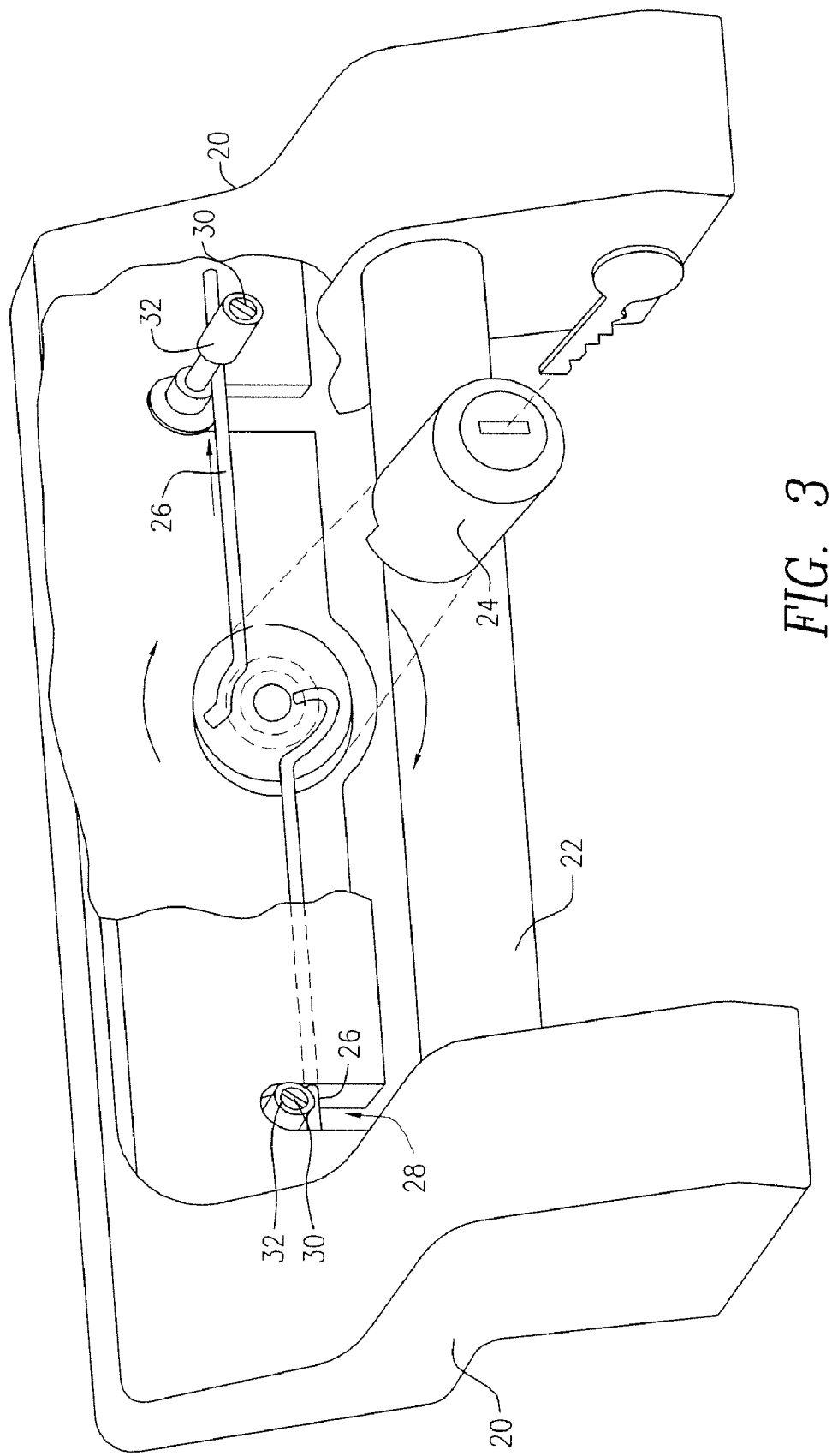
FIG. 3 shows a locking mechanism of the bumper guard of the present invention.

Referring now to FIG. 3, once the locator 20 is placed on the sleeves 32, the cam 24 and rods 26 of the locking mechanism is used to lock the guard 10 in place. The cam 24 and rods 26 cooperate with sleeves 32 to secure the guard 10. For instance, after the locator 20 is disposed on the sleeves 32, the user locks or secures the locator 20 by rotating the cam 24 with a key and extending the rods 26 into a generally linear arrangement. The rods 26 are dimensioned and configured to slide under and past the tapered part of the sleeves 32. In the extended position, the rods 26 slide past the sleeves 32 and either enter apertures located in or abut inner walls of the locator 20. The locking mechanism prevents theft, dislodging, or "riding-up" of the bumper guard 10 when being compressed by another vehicle. In some embodiments, the cam 24 may be off-center. Cam 24 and rods 26 may be made of steel or other suitable material.

As shown in the figures, the bottom piece 40 rests over the vehicles rear bumper and serves to deflect and protect the bumper. In addition, in an alternative embodiment, the first piece 20 is used as a method for attachment of an alternative second piece 43.

The molded "T" sections 41, 42 allow for the locator 20 and the bottom piece 40 to be removably attached. The bottom piece 40 therefore can be removed from the locator 20 and replaced if damaged or worn. The bottom piece 40 may be customized for size or shape, and product updates, or to accommodate different types of vehicles. The bottom piece 40 may be made of a variety of materials and may have any thicknesses. Some embodiments may also have various coatings for protection from the elements or to provide firmness. In one example, the bottom piece 40 may be 2" thick and made of a cross-linked polyethylene foam, or vinyl coated urethane. The bottom piece 40 will be non-abrasive to the surface of the actual vehicle.

Figure 4:
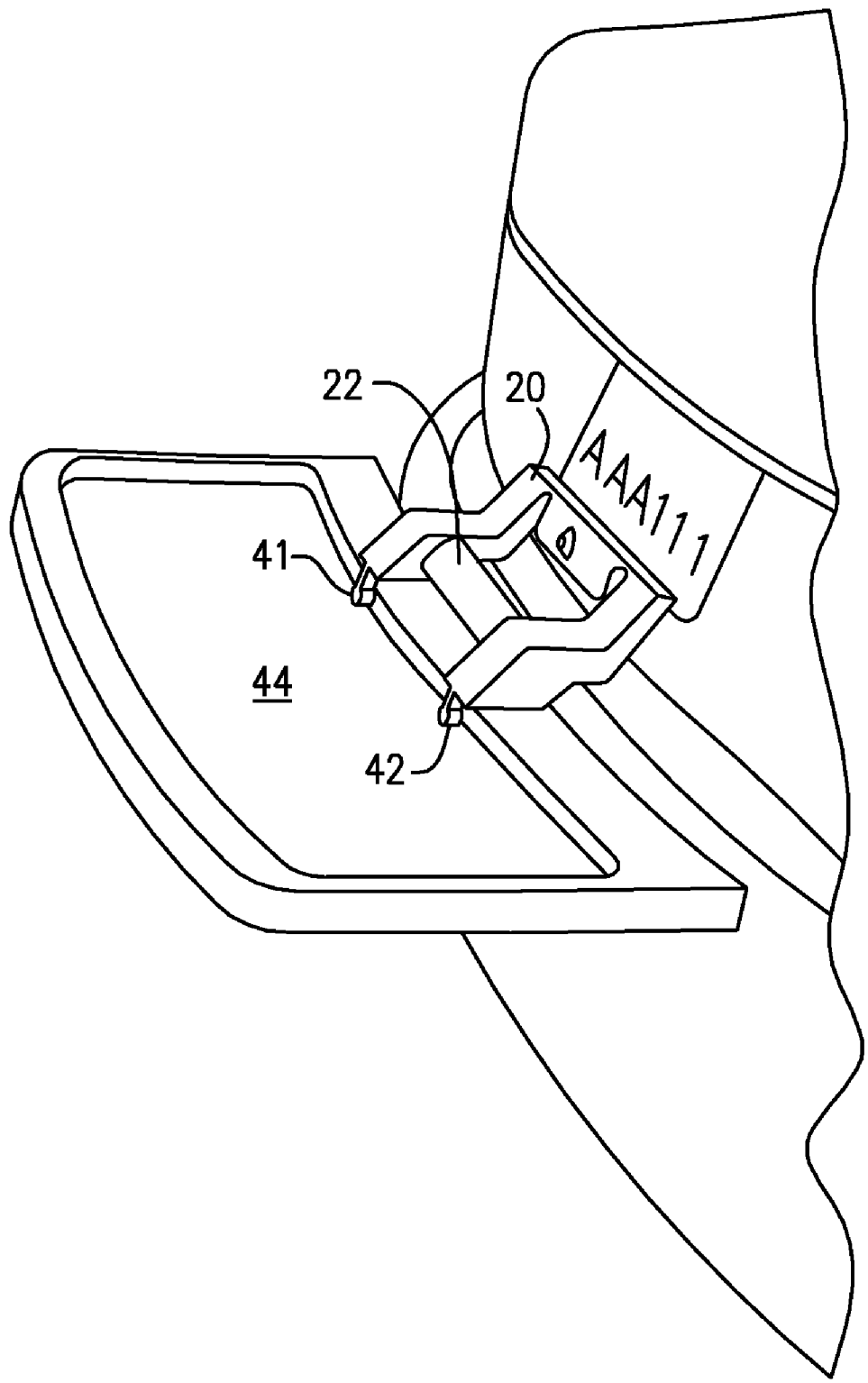
FIG. 4 shows a second embodiment of the present invention.

Referring now to FIG. 4 there is shown a tailgate platform 44 which is attached to piece 20 in the same manner as piece 40 is attached to piece 20. The tailgate platform 44 can be used by a car owner for tailgating activities such as occur at football games or other sporting activities, or as a work surface for any other activity. It is to be understood that platform 44 can be of various shapes, other than the shape shown in FIG. 4, and can also include such additional features as cup holders or a built in ice chest.

Other attachments to the car bumper are also possible with the present invention including bicycle or other types of storage racks, storage containers, advertising displays, animal carriers or any other type of attachment useful to the vehicle owner.

The bumper guard embodiment of the present invention provides a barrier of protection to the rear bumper of recent model vehicles, but may be modified to protect front bumpers. The bumper guard can be easily attached to the vehicle, stored and removed. The method of attachment of the first piece of the bumper guard also provides the possibility of alternative embodiments, including a "tailgate tray platform" that attaches using the "T" connection system and many other types of attachments. While the present invention has been described in conjunction with specific embodiments, those of normal skill in the art will appreciate the modifications and variations can be made without departing from the scope and the spirit of the present invention. Such modifications and variations is envisioned to be within the scope of the appended claims.

I claim:

1. A bumper guard for a vehicle comprising:
    sleeves, said sleeves attached to a vehicle through holes of a license plate, said sleeves having a tapered portion; and
    a bumper guard having a first piece and a second piece, said first piece having sleeve grooves and a locking mechanism, said sleeve grooves being dimensioned and configured to receive said sleeves, said locking mechanism comprising a cam and rods, said rods are dimensioned and configured to slide under and past the tapered portion of the sleeves, and, said second piece is connected to said first piece and is dimensioned and configured to rest over a bumper of the vehicle,
    wherein, after said sleeves are disposed in said sleeve grooves, said cam is rotated to extend the rods into a generally linear arrangement, said rods sliding under and past the tapered portion of the sleeves to lock the bumper guard 10 in place.

2. The bumper guard of claim 1, wherein said sleeves are attached to lower holes of said license plate.

3. The bumper guard of claim 1, wherein said second piece is connected to the first piece using an integral "T" connection system.

4. The bumper guard of claim 1, wherein the second piece is removably connected directly to an integral "T" in the first piece.

5. The bumper guard of claim 1, wherein the second piece is made of cross-linked polyethylene foam, urethane coated vinyl, or other suitable foam barrier material.

6. The bumper guard of claim 1, wherein the second piece is removeably connected to the first piece.

7. The bumper guard of claim 1, wherein said sleeves are integrated into a license plate holder.

8. The bumper guard of claim 1, wherein said tapered portion of said sleeves are dimensioned and configured to the sleeve grooves.

* * * * *